(12) United States Patent
Sakamoto et al.

(10) Patent No.: US 7,172,400 B2
(45) Date of Patent: Feb. 6, 2007

(54) FRICTION MEMBER MANUFACTURING APPARATUS

(75) Inventors: Yoshinori Sakamoto, Gunma (JP); Masanori Ueno, Gunma (JP)

(73) Assignee: Nisshinbo Industries, Inc., Tokyo (JP)

( * ) Notice: Subject to any disclaimer, the term of this patent is extended or adjusted under 35 U.S.C. 154(b) by 404 days.

(21) Appl. No.: 10/865,070

(22) Filed: Jun. 10, 2004

(65) Prior Publication Data
US 2005/0048160 A1 Mar. 3, 2005

(30) Foreign Application Priority Data
Jul. 7, 2003 (JP) .............................. 2003-271227

(51) Int. Cl.
*B29C 43/04* (2006.01)
*B29C 43/36* (2006.01)

(52) U.S. Cl. ...................... 425/182; 425/186; 425/390; 425/411; 425/423; 425/450.1

(58) Field of Classification Search ................ 425/182, 425/186, 352–355, 390, 408, 411–415, 423, 425/450.1
See application file for complete search history.

(56) References Cited

U.S. PATENT DOCUMENTS 4,815,690 A * 3/1989 Shepherd .................... 425/808
5,427,599 A * 6/1995 Greschner et al. .......... 425/389
6,004,491 A * 12/1999 Ogawa ....................... 264/46.4

FOREIGN PATENT DOCUMENTS

KR 2005103152 A * 10/2005

* cited by examiner

*Primary Examiner*—Yogendra N. Gupta
*Assistant Examiner*—Thu Khanh T. Nguyen
(74) *Attorney, Agent, or Firm*—Muramastsu & Associates (57) ABSTRACT

The present invention provides an improved multi-mold apparatus for manufacturing friction members, with each mold composed of a set comprising a first (top) mold, a second (bottom) mold, and a frame mold. The apparatus is capable of correcting any misalignment in the mountings of the plurality of molds and accurately aligning the molds by movably supporting at least one of the first mold, the second mold and the third mold by first, second and frame bases, respectively, so that the base and molds are movable laterally, in a direction perpendicular to the direction of advance. Projections are formed on one of the first mold and either the frame mold or the back plate and bonding through-holes are formed on the remaining mold or the back plate, so that the projections engage the holes so as to align the first mold and the frame mold accurately.

6 Claims, 9 Drawing Sheets

FRICTION MEMBER MANUFACTURING APPARATUS

CLAIM OF PRIORITY

This application claims priority from Japanese Patent Application No. 2003-271227, entitled "Friction Member Manufacturing Apparatus" filed on Jul. 7, 2003, the entire contents of which are incorporated herein by reference.

FIELD OF THE INVENTION

The present invention relates to an improved friction member manufacturing apparatus for manufacturing friction member used in a vehicle brake assembly, and more particularly, to a friction member manufacturing apparatus that is multi-mold so as to mold multiple friction members at once.

BACKGROUND OF THE INVENTION

A friction member for a vehicle brake assembly is formed by affixing friction material manufactured from a raw material mixture of fiber, filler and a binder to a steel back plate. However, simply attaching the friction material to just one side of the back plate does not provide the friction member with adequate adhesive strength. As a result, one or more bonding through-holes are formed in the back plate and the friction material is forced into the bonding through-holes at the same time as friction material is affixed to one side of the back plate, in order to increase the strength of the attachment by contacting the friction material against the insides of the bonding through-holes.

Figure 7A:
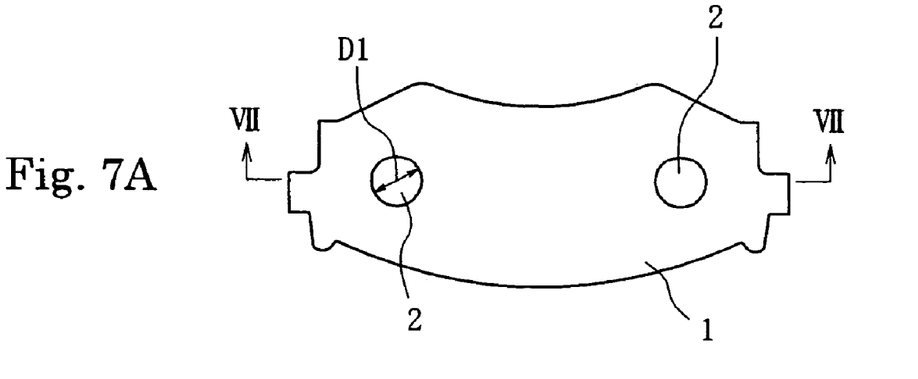
FIGS. 7A and 7B are diagrams showing a conventional friction member back plate, with FIG. 7A showing a plan view and FIG. 7B showing a lateral cross-sectional view along a line VII—VII.
Figure 7B:
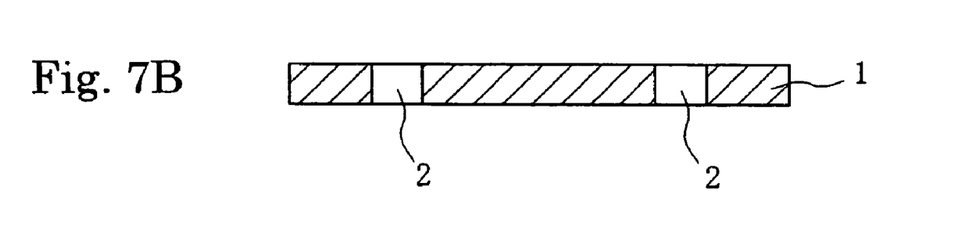

FIGS. 7A and 7B are diagrams showing a conventional friction member back plate, with FIG. 7A showing a plan view and FIG. 7B showing a lateral cross-sectional view along a line VII—VII. The friction member is used as the disk pad of a disk brake. A back plate 1 shown in the diagram is formed by using a press to stamp automobile sheet metal or machine tool sheet metal to a predetermined shape and simultaneously forming two bonding through-holes 2, 2, in the back plate 1.

After being stamped by the press, the back plate 1 is subjected to an oil-removal process that removes oil from the surface of the back plate 1. The surface is then finished by sand-blasting, after which it is coated with a thermosetting binder in order to increase the strength of the attachment to the friction material.

The raw material of the friction material is, as described above, a mixture of fiber, filler and a binder. The fiber used is either organic fiber, such as cellulose or aramid fibers, metal fiber made from chips of metal or steel, or inorganic fiber such as rock fiber. The filler is there to provide volume and lubrication, in order to obtain stable friction, and may, for example, be barium sulfate, calcium carbonate or graphite. A thermosetting resin, which may be phenol resin or urea resin, is used for the binder, which binds the fiber and filler together.

The raw material of the friction material, once the ingredients have been mixed together, is then weighed to a predetermined weight, put into a metal mold, not shown, compressed, and formed into a semi-finished product. At this point, the friction material, which in principal is formed only by compression, is not baked but in some cases might be heated to a temperature range within which the binder does not react. It should be noted that the friction member of the present invention includes the aforementioned semi-finished product as well.

Figure 8A:
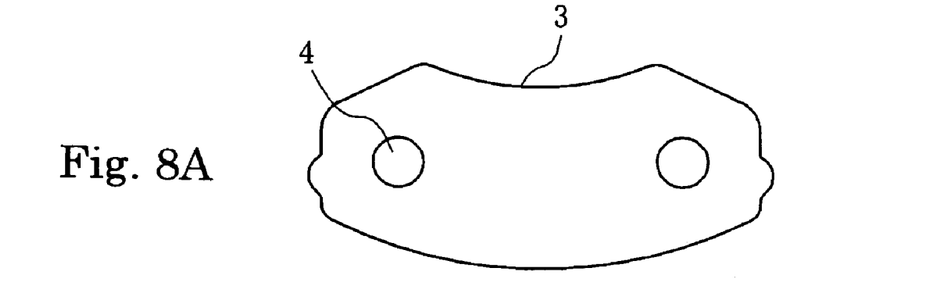
Figure 8B:
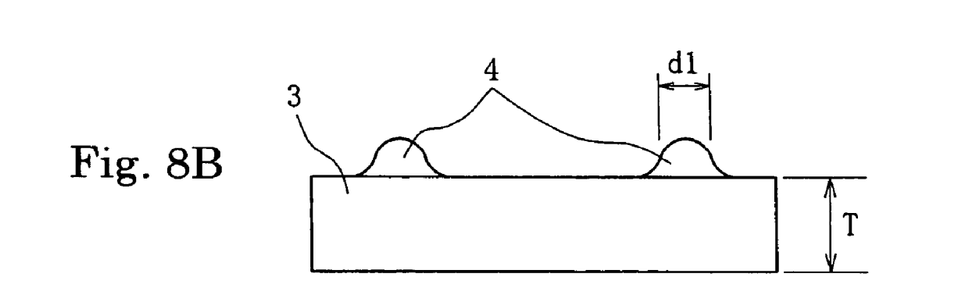

FIGS. 8A and 8B are diagrams showing the friction material as a semi-finished product provisionally formed as described above, in which FIG. 8A shows a plan view of the semi-finished product and FIG. 8B shows a front view of the semi-finished product. The semi-finished product 3, although shaped like the final product, is not dense, and has a thickness T that is approximately twice that of a thickness t (shown in FIG. 10) of the final product pressed onto the back plate 1 and compressed to a predetermined density. In addition, convex portions 4, 4 corresponding to the bonding through-holes 2,2 described above are formed on the semi-finished product 3. The convex portions 4, 4 are broad at a base but narrow toward a tip to a diameter d1 that is smaller than a diameter D1 (in FIG. 7) of each of the bonding through-holes 2, 2, so that the convex portions 4, 4 can be fitted easily into the bonding through-holes 2, 2.

When the back plate 1 and the semi-finished friction material product 3 are attached to each other as described above, they are sent to the press shown in FIG. 9. The press is a multi-mold type, with a plurality of sets of molds, each formed by an arrangement consisting of a top mold 5 and a corresponding frame mold 6 and a bottom mold 7, all disposed on a single surface.

Figure 9:
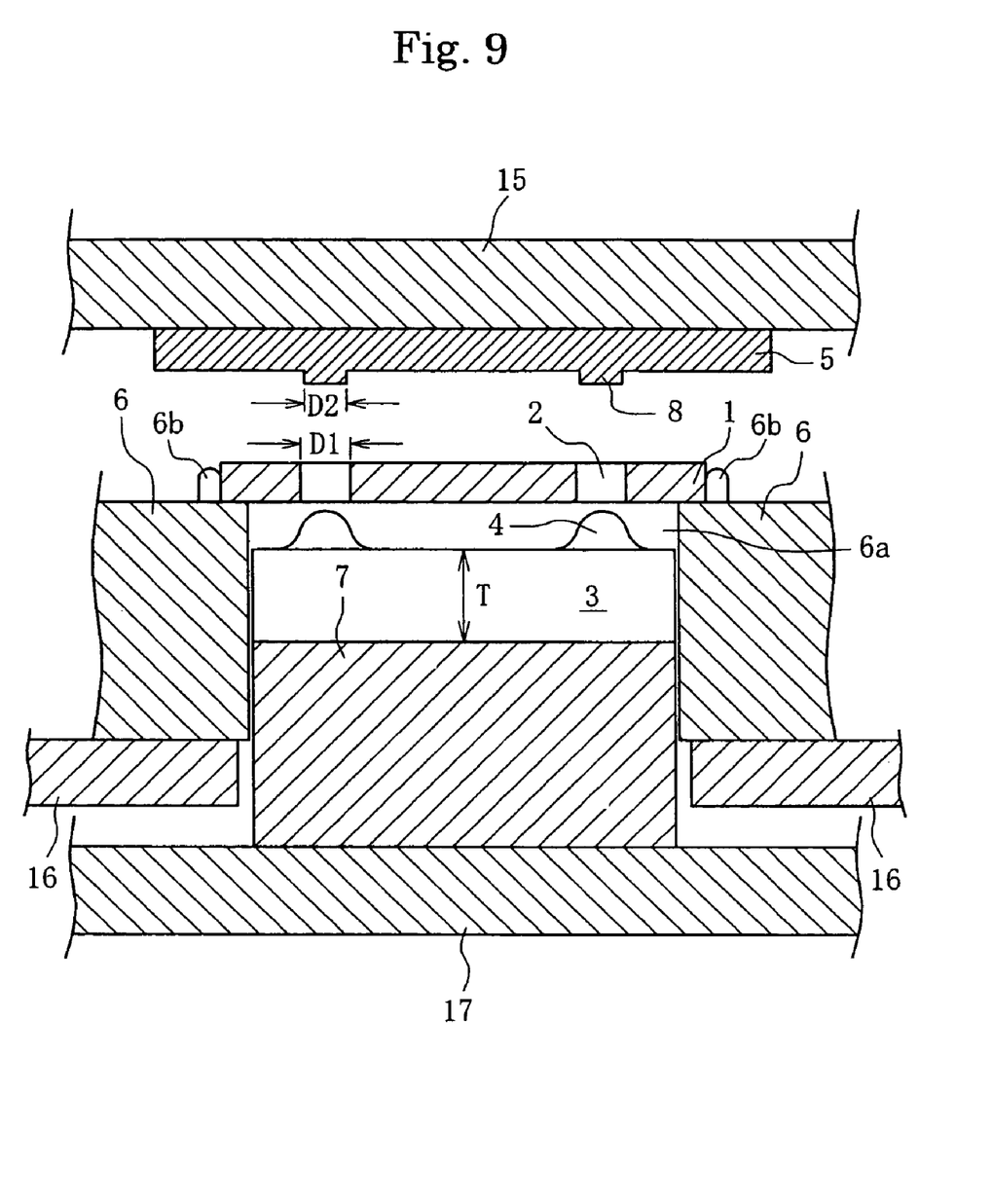
FIG. 9 is a diagram showing a cross-sectional view of the essential parts of a conventional friction member manufacturing apparatus.

A vertically traverse space 6a is formed in the frame mold 6, with the bottom mold 7, which in cross-section is identical to the cross-section of the space 6a of the frame mold 6, entering from below the space 6a to form the bottom of the space 6a, in which the semi-finished product 3 is contained. In the event that the semi-finished product 3 is not used, powdered friction raw material is inserted instead. The bottom mold 7 can be raised and lowered within the space 6a. The top mold 5 can be contacted with and separated from the frame mold 6.

A plurality of top molds 5 are mounted at predetermined intervals on a top mold base 15, with a plurality of frame molds 6 corresponding to the top molds 5 mounted on a frame mold base 16, and bottom molds 7, slidably inserted into the frame molds 6, mounted on a bottom mold base 17. The entire assembly is configured so that the top mold base 15 can descend and the bottom mold base 17 can ascend within the frame mold 6.

A plurality of alignment pins 6b for positioning the back plate 1 are provided on a top surface of the frame mold 6. Two projections 8 corresponding to the two bonding through-holes 2 are provided on a bottom surface of the top mold 5. The two projections 8 are cylinders having a height less than a thickness of the back plate 1 and a diameter D2 less than a diameter D1 of the bonding through-holes 2.

The multi-mold construction of the press shown in FIG. 9 greatly improves productivity. Moreover, the top mold 5, frame mold 6 and bottom mold 7 are detachably mounted on the bases 15, 16 and 17, respectively, and thus can be replaced with other molds. Such a configuration makes it possible to switch easily between the manufacture of friction members of various different shapes.

Next, a description is given of a method of manufacturing the friction member using the manufacturing apparatus shown in FIG. 9.

First, as shown in FIG. 9, the semi-finished product 3 is placed on the bottom mold 7 within the frame mold 6, with the back plate 1 placed on the frame mold 6. Where the semi-finished product 3 is not used, powdered friction raw material is placed inside the frame mold 6, with the back plate 1 placed on top of the raw material and the alignment pins 6b aligning the back plate 1. Thereafter, the top mold 5 descends, the two projections 8 enter the two bonding through-holes 2, 2 from above and the back plate 1 is pressed against the frame mold 6. At the same time, the bottom mold 7 ascends and the convex portions 4, 4 corresponding to the bonding through-holes 2, 2, or the powdered friction raw material, as the case may be, enter the bonding through-holes 2, 2, and the back plate 1 and the semi-finished product 3 overlap and are compressed and heated.

Figure 10:
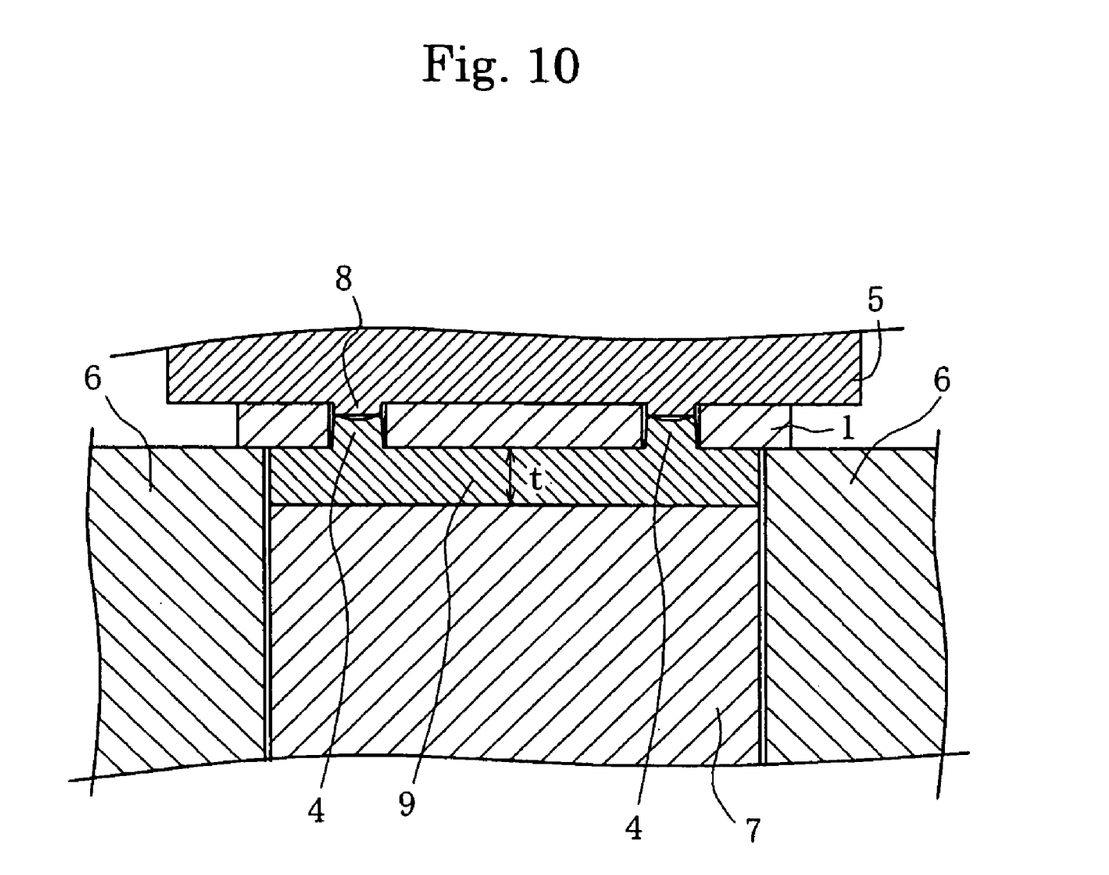
FIG. 10 is a diagram showing a state in which a press shown in FIG. 9 has completed compression and heating.

FIG. 10 is a diagram showing a state in which the press has completed compression and heating. As shown in the diagram, the friction material semi-finished product 3, in which the binder material has reacted due to the heat, has been compressed and become denser, with a thickness T halved to a new thickness t, to form a friction material 9 of a predetermined thickness that is attached to the back plate 1. Further, the convex portions 4, 4 inside the bonding through-holes 2, 2 are pressed down from the top by the projections 8, 8 formed in the top mold 5 and spread out within the bonding through-holes 2, 2 so as to adhere tightly to the inner walls of the bonding through-holes 2, 2.

Figure 11A:
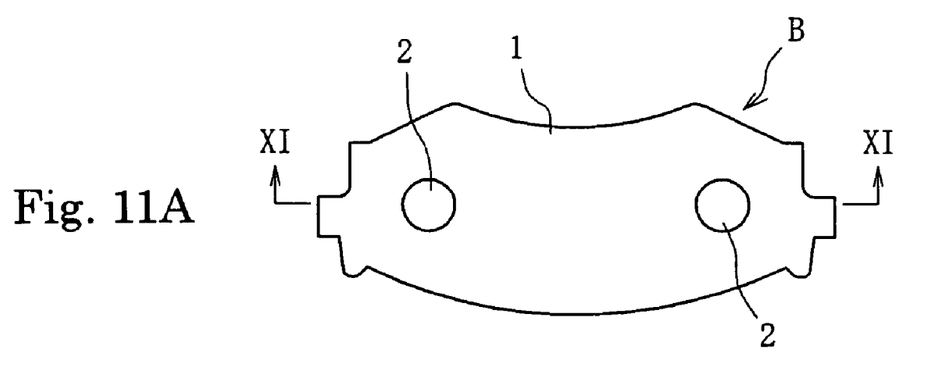
FIGS. 11A and 11B are diagrams showing a plan view and a lateral cross-sectional view, respectively, along a line XI—XI of a friction member formed according to the present invention.
Figure 11B:
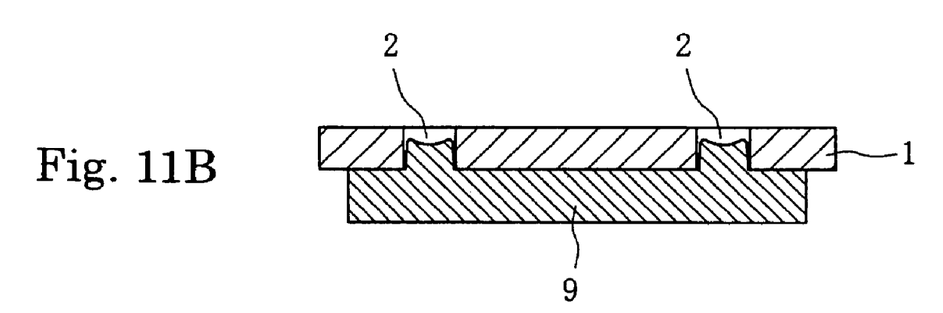

FIGS. 11A and 11B are diagrams showing a plan view and a lateral cross-sectional view, respectively, along a line XI—XI of a friction member formed according to the present invention. A friction material 9 is bonded both to a bottom surface of the back plate and inside surface of the bonding through-holes 2, 2, and increase the strengh of the attachment.

However, in the conventional art described above, the diameter D2 of the cylindrical projections 8, 8 on the top mold 5 must be substantially smaller than the diameter D1 of the bonding through-holes 2, 2. In other words, because of the multi-mold construction of the press as described above, cumulative error occurs when mounting a plurality of molds, and as a result the accuracy with which the projections 8, 8 and the bonding through-holes 2, 2 are aligned cannot be improved. As the diameter D2 of the projections 8, 8 approaches the diameter D1, the projections 8, 8 become unable to enter the bonding through-holes 2, 2 and instead sink into the peripheral areas thereof, which in turn makes separation after formation difficult.

As a multi-mold technique, a method that is described in Japanese Laid-Open Patent Publication No. 2000-27914 is known. This method involves arranging an even number of back plates symmetrically about a line in a single integrated back plate assemblage, pressing a similar integrated assemblage of friction material onto the back plate assemblage, and then cutting into a plurality of friction members.

However, the above-described method handles the back plate as an assemblage of multiple back plates formed into a single integrated structure, and therefore the problem of back plate relative positional error does not arise. Accordingly, no mention is made of the problem of the projections 8, 8 becoming unable to enter the bonding through-holes 2, 2 and instead sinking into the peripheral areas thereof and making separation after formation difficult when affixing friction material to a plurality of back plates.

BRIEF SUMMARY OF THE INVENTION

The present invention is conceived in light of the foregoing drawback of the conventional art, and has as an object to provide an improved friction member manufacturing apparatus of multi-mold construction that is provided with a plurality of sets of molds to affix friction material to a plurality of back plates simultaneously and that corrects errors in the positioning of each of the molds that comprise the plurality of mold sets so as to provide accurate mold positioning.

According to a first aspect of the present invention, the foregoing object is attained by providing a friction member manufacturing apparatus comprising:

a frame mold, having a space for containing friction material, the space penetrating the frame mold;

a first mold, disposed on one side of the space in the frame mold and moving relative to the frame mold so as to separably contact the frame mold, either directly or via an intermediate member; and a second mold, disposed on a side of the space in the frame mold opposite the side on which the first mold is disposed so as to enclose the space, the second mold capable of moving relative to the frame mold, in such a way as to enter and exit an interior of the frame mold;

a first mold base for supporting a plurality of first molds;

a frame mold base for supporting a plurality of frame molds; and a second mold base for supporting a plurality of second molds, at least one of the mold bases, and the molds supported by the at least one of the bases, supported in a state in which the base and the molds the base supports are movable in a direction perpendicular to a direction in which the second mold enters and exits the interior of the frame mold, a convex portion formed on either the first mold and the frame mold or intermediate member, and a concave portion formed on another side, the convex portion and the concave portion engaging each other so as to align the first mold and the frame mold with each other.

According to a second aspect of the present invention, the foregoing object is also attained by providing a friction member manufacturing apparatus as described above, wherein at least one of the convex portion and the concave portion is provided with guide surface for guiding the other portion.

According to a third aspect of the present invention, the foregoing object is also attained by providing a friction member manufacturing apparatus as described above, wherein at least one base and the molds supported by the base are the first mold base and the first mold.

According to a fourth aspect of the present invention, the foregoing object is also attained by providing a friction member manufacturing apparatus as described above, wherein at least one base and the molds supported by the base are the frame mold base and the frame mold, and the second mold base and the second mold.

According to a fifth aspect of the present invention, the foregoing object is also attained by providing a friction member manufacturing apparatus as described above, wherein the friction member is a friction material affixed to a back plate, the intermediate member is the back plate of the friction member, the concave portion is a bonding through-hole formed in the back plate and the convex portion is a projection that enters the bonding through-hole formed in the first mold.

According to a sixth aspect of the present invention, the foregoing object is also attained by providing a friction member manufacturing apparatus as described above, wherein, the projection has a guide surface provided on at least one of a base portion or a tip portion thereof.

A plurality of first molds are mounted on the first mold base, a plurality of frame molds are mounted on the frame mold base, and a plurality of second molds are mounted on the second mold base. The first mold separably contacts the frame mold either directly or through an intermediate member.

In a multi-mold configuration like that described above, when a plurality of molds is mounted on a single mold base, errors in mounting position arise. It can happen that such mounting position errors accumulate, until the gap between one mold and its opposing pair grows large, with the result that the manufactured friction member can be defective and the molds can bite into each other, causing the manufacturing apparatus to break down.

According to the present invention, for example, the first mold is mounted so as to be movable with respect to the first mold base. If there is a gap between the mounting positions of the first mold and the corresponding to frame molds and second molds, a convex portion formed on either the first mold and the frame mold or an intermediate member and a concave portion formed on the remaining member engage each other, thus moving the first mold and enabling the first mold to be guided to the correct position.

Alternatively, instead of mounting the first mold so as to be movable with respect to the first mold base, the frame mold may be mounted so as to be movable with respect to the frame mold base, or, further, the second mold may be mounted so as to be movable with respect to the second mold base, and achieve the same effect.

According to the friction member manufacturing apparatus of the present invention, by mounting at least one of the base and the molds supported thereon so that the base and molds are movable laterally, in a direction perpendicular to the direction of advance, and forming convex portion on either the first mold and either the frame mold or the intermediate member, and forming concave portion on another side, so that the convex portion engage concave portion and align the first mold and the frame mold, any error in mounting position, that is, misalignment, of the first and second molds and the frame mold that together form each of the plurality of molds in the multi-mold configuration can be corrected, and the molds can be aligned by the movable molds moving when the convex portion and concave portion engage.

The friction member is formed by affixing friction material to the back plate, with the friction member back plate being the intermediate member described above. The back plate has bonding through-holes as the above-described concave portions, and projections that enter and engage the bonding through-holes as the above-described convex portions are provided on the first mold. As a result of such a configuration, misalignment between the molds can be prevented.

Providing guide surfaces on the tips of the projections enables the projections to engage the bonding through-holes easily even if the projections and holes are misaligned. Providing guide surfaces on the bases of the projections enables the projections to be centered easily within the bonding through-holes.

Other features, objects and advantages of the present invention will be apparent from the following description when taken in conjunction with the accompanying drawings, in which like reference characters designate identical or similar parts throughout the figures thereof.

BRIEF DESCRIPTION OF THE DRAWINGS

The accompanying drawings, which are incorporated in and constitute apart of the specification, illustrate embodiments of the invention and, together with the description, serve to explain the principles of the invention.

FIGS. 4A and 4B are diagrams showing an enlarged top view of a bonding through-hole after a friction material is affixed to a back plate, in which FIG. 4A shows the outline of the projection askew and FIG. 4B shows the outline of the projection centered.

FIGS. 8A and 8B are diagrams showing the friction material as a semi-finished product provisionally formed, in which FIG. 8A shows a plan view of the semi-finished product and FIG. 8B shows a front view of the semi-finished product;

DETAILED DESCRIPTION OF THE INVENTION

Preferred embodiments of the present invention are now described in detail in accordance with the accompanying drawings.

Figure 1:
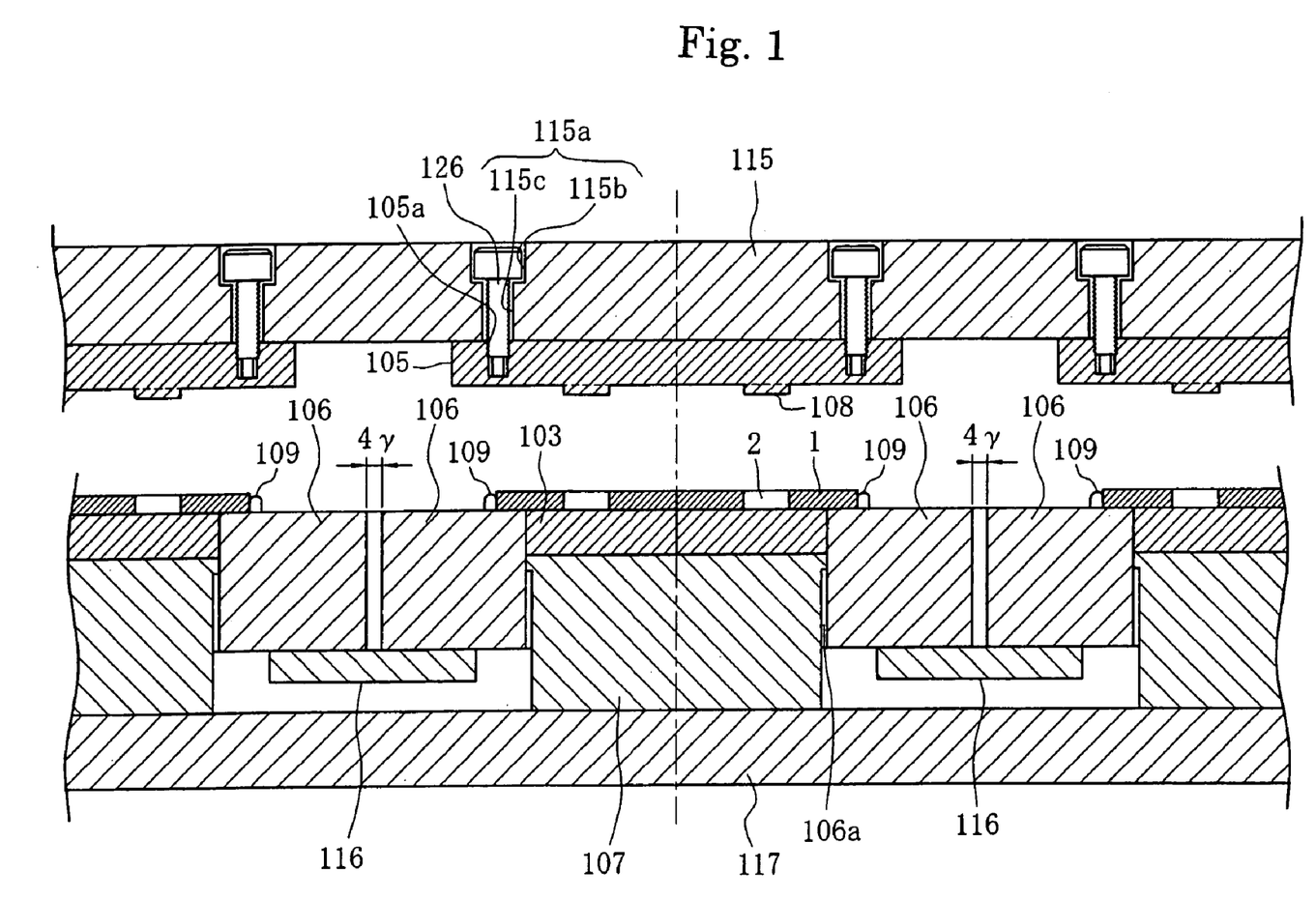
FIG. 1 is a diagram showing a front cross-sectional view of the main parts of a friction member manufacturing apparatus of the present invention.

FIG. 1 is a diagram showing a front cross-sectional view of the main parts of a friction member manufacturing apparatus of the present invention.

The basic structure of the manufacturing apparatus shown in FIG. 1 is the same as that of the conventional apparatus described above. In other words, a first mold 105, which is a top mold, has a projection 108 as a convex portion. A frame mold 106 is provided with a space 106a formed so as to completely penetrate the frame mold 106 vertically. A second mold 107, which is a bottom mold, is the same shape as the space 106a, and is inserted into the space 106a from below the space 106a to form a bottom surface for the space 106a, allowing powdered friction raw material 103 or a semi-finished product 3 to be inserted into the space 106a.

The first mold 105 is supported by a first mold base 115, the frame mold 106 is mounted on a frame mold base 116, and the second mold 107 is mounted on a second mold base 117 so as to be enter and exit an interior of the frame mold 106.

As with the conventional art, alignment pins 109 are provided on a top surface of the frame mold 106. Similarly, the back plate 1, too, as with the conventional art, has a plurality of bonding through-holes 2, 2 as concave portions. In the present embodiment, the distinctive feature is that the first mold base 115 supports the first mold 105.

Figure 2:
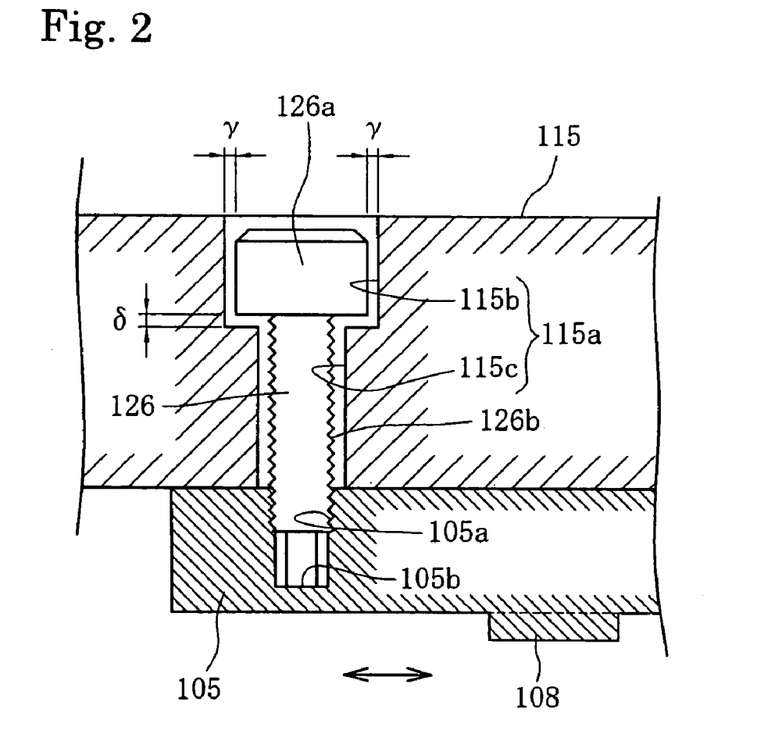
FIG. 2 is a diagram showing an enlarged cross-sectional view of a portion at which a first mold is supported by a first mold base.

FIG. 2 is a diagram showing an enlarged cross-sectional view of a portion at which the first mold 105 is supported by the first mold base 115. The first mold support has at least two mounting holes 115a for every first mold 105. The mounting hole 115a is a stepped aperture, with a wide portion 115b and a narrow portion 115c. The wide portion 115b is larger than a head 126a of a mounting bolt 126 by a dimension γ on a side, with the narrow portion 115c of the mounting hole 115a by a same dimension γ on a side. The mounting bolt 126 may, for example, be a bolt with a square hole or a hexagonal hole.

A female screw hole 105a is formed in the first mold 105. The narrow portion 115c of the mounting hole 115a and the female screw hole 105a are vertically aligned, the mounting bolt 126 is inserted through the wide portion 115b and through the first mold base 115 so as to engage the female screw hole 105a formed in the first mold. Then, when the tip of the mounting bolt 126 is tightened so as to contact the bottom surface 105b of the female screw hole 105a, so that a space δ remains between the underside of the head 126a of the mounting bolt 126 and the bottom surface of the wide part 115b of the mounting hole 115a. In addition, an interval between adjacent frame molds 106 is at least 4γ. With such a structure, the first mold 105 is able to move slightly laterally (in FIG. 2) by an amount γ with respect to the first mold base 115. In other words, even if the first mold 105 is out of position with respect to the frame mold 106, so long as the misalignment is within 2γ, the projection 108 can be inserted into the bonding through-hole 2 by moving the first mold 105.

Figure 3:
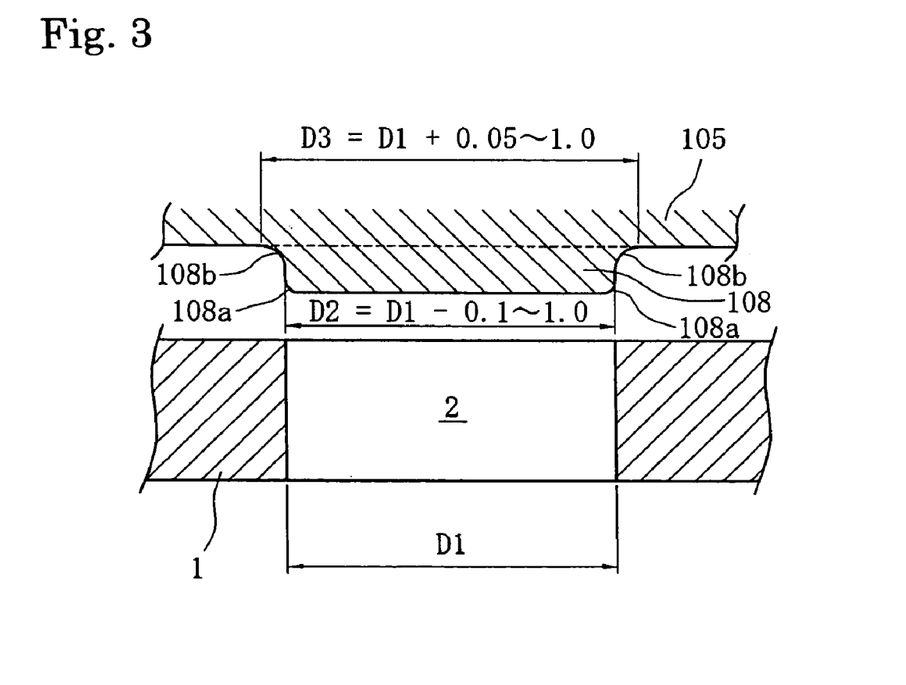
FIG. 3 is a diagram showing an enlarged lateral cross-sectional view of a first mold projections and a bonding through-hole.

FIG. 3 is a diagram showing an enlarged cross-sectional view of the projection 108 of the first mold and the bonding through-hole 2. The tip of the projection 108 is provided with a guide surface 108a, in which the edge of the tip is rounded off, so that, even with the misalignment between the projection 108 and the bonding through-hole 2 described above, the projection 108 slides easily into the bonding through-hole 2. Moreover, a similar curved guide surface 108b is provided at the base of the projection 108 as well, the guide surface 108b widening toward the base. The two guide surfaces 108a and 108b make it easier to center and insert the projection 108 into the bonding through-hole 102.

The values of the bonding through-hole diameter D1, the projection 108 diameter D2 and the projection 108 base guide surface diameter D3 are determined by the number of surfaces and the accuracy with which they are positioned. As one example, for illustrative purposes only, if the bonding through-hole 2 diameter is D1, then the diameter D2 of the projection 108 may be 0.1–1.0 mm smaller than D1, and the projection base guide surface 108b diameter D3 may be 0.05–1.0 mm larger than D1.

Next, a description is given of the method of manufacturing the friction member.

First, the first mold 105 and the frame mold 106 are separated and the powdered friction raw material 103 is put into the space 106a of the frame mold 106. Alternatively, the semi-finished product 3 described above may be used instead of the powdered friction raw material 103.

Next, the back plate 1 is set on the frame mold 106. The alignment pins 109 provided on the top surface of the frame mold 106 determine the position of the back plate 1.

In the state described above, the first mold is lowered, forcing the projections 108 into the bonding through-holes 2. At this time, even if the projections 108 and the bonding through-holes 2 are misaligned, the guide surface 108a at the tip of the projections 108 enable the first mold 105 to move laterally within a range of 2γ, thus enabling the misalignment to be corrected. After the projections 108 have entered the bonding through-holes 2, the first mold 105 is forced against the back plate 1, which brings the guide surface 108b at the base of the projections 108 into force so as to center the projections 108 in the bonding through-holes 2. The same type of misalignment correction is carried out for all the first molds and frame molds that comprise the multi-mold configuration.

Thereafter, the second mold 107 is raised and the friction raw material 103 is compressed and then heated by a heating means not shown, melting and compressing the friction raw material 103 so as to produce a friction member with friction material 9 affixed to the back plate 1 as shown in FIG. 10.

In the construction described above, the ascent and descent of the first mold 105, the frame mold 106 and the second mold 107 is not limited, and the movement may be relative. In other words, although in the embodiment described above, the frame mold 106 is fixed in position while the first mold 105 and the second mold 107 are raised and lowered, alternatively, the first mold 105 may be fixed while the frame mold 106 and the second mold 107 are raised and lowered, or the second mold 107 may be fixed while the first mold 105 and the frame mold 106 may be raised and lowered.

Figure 4A:
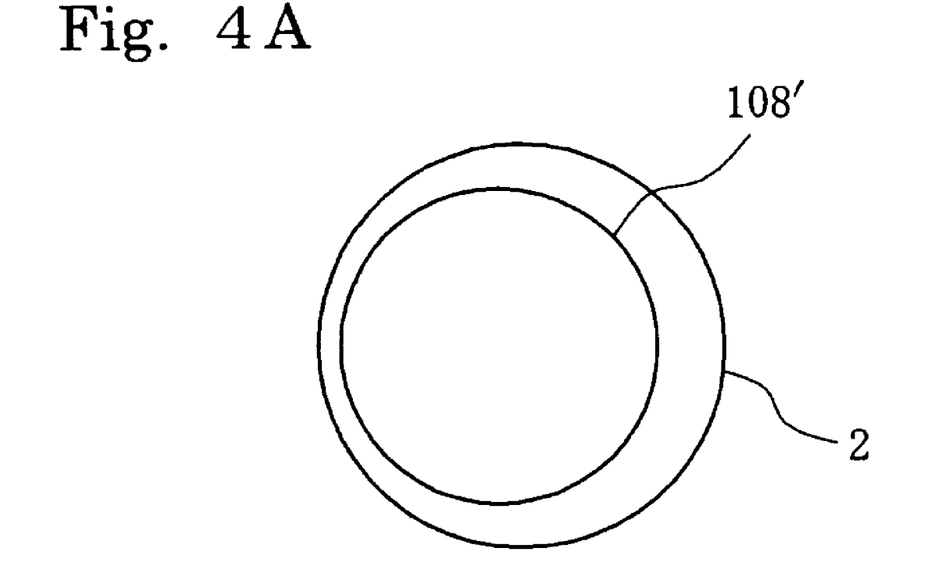
Figure 4B:
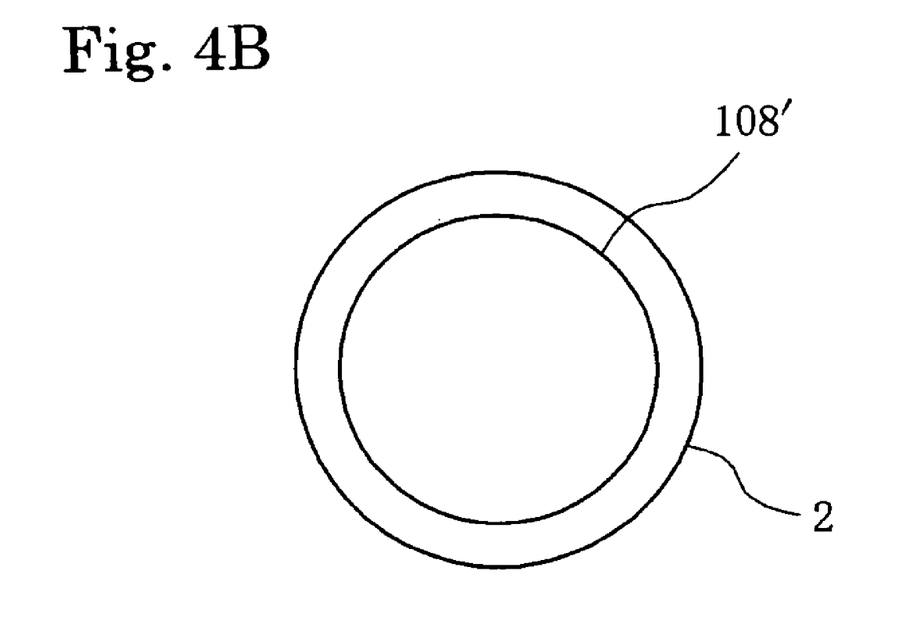

FIGS. 4A and 4B are diagrams showing an enlarged top view of a bonding through-hole after a friction material is affixed to a back plate 1, in which FIG. 4A shows an outline of the projection askew and FIG. 4B shows the outline of the projection centered. The interior of the bonding through-hole 2 is filled with friction raw material 103 that hardens, but that portion compressed by the projection 108 appears as an impression 108'. If there were no guide surface 108b on the base of the projection 108 but a perfect right angle instead, the guide surface 108a at the tip of the projection 108 would still enable the projection 108 to enter the bonding through-hole 2 but would not be centered, and would instead be biased toward one side of the bonding through-hole 2 like the projection 108' shown in FIG. 4A. As a result, there is a risk that the friction raw material 103 filling the interior of the bonding through-hole 2 would be compressed with a bias, resulting in inconsistent, or uneven, density.

By contrast, according to the embodiments of the present invention, the guide surface 108b provided at the base of the projection 108 is curved, so that, when the first mold 105 is pressed against the back plate 1, as shown in FIG. 4B, the projection 108 moves automatically to the center of the bonding through-hole 2, so that the impression 108' laid down in the friction raw material 103 by the projection 108 can be centered. Accordingly, the friction raw material 103 filling the interior of the bonding through-hole 2 is compressed with uniform force over its entire surface, thus enabling the density of the material to be uniform and thereby improving the quality of the finished product.

It should be noted that, although the tip edge 108a and base edge 108b, in other words the tip guide surface 108a and the base guide surface 108b, are shown to be arc shaped in cross-section in the embodiment shown in FIG. 3, such edge guide surfaces are not limited to the arc shape described above. Therefore, provided that misalignment between the projection 108 and the bonding through-hole 2 is corrected and the projection 108 can be centered in the bonding through-hole 2, the edge guide surfaces may be any shape, and thus may, for example, be slanted surfaces such as portions of a cone.

Figure 5:
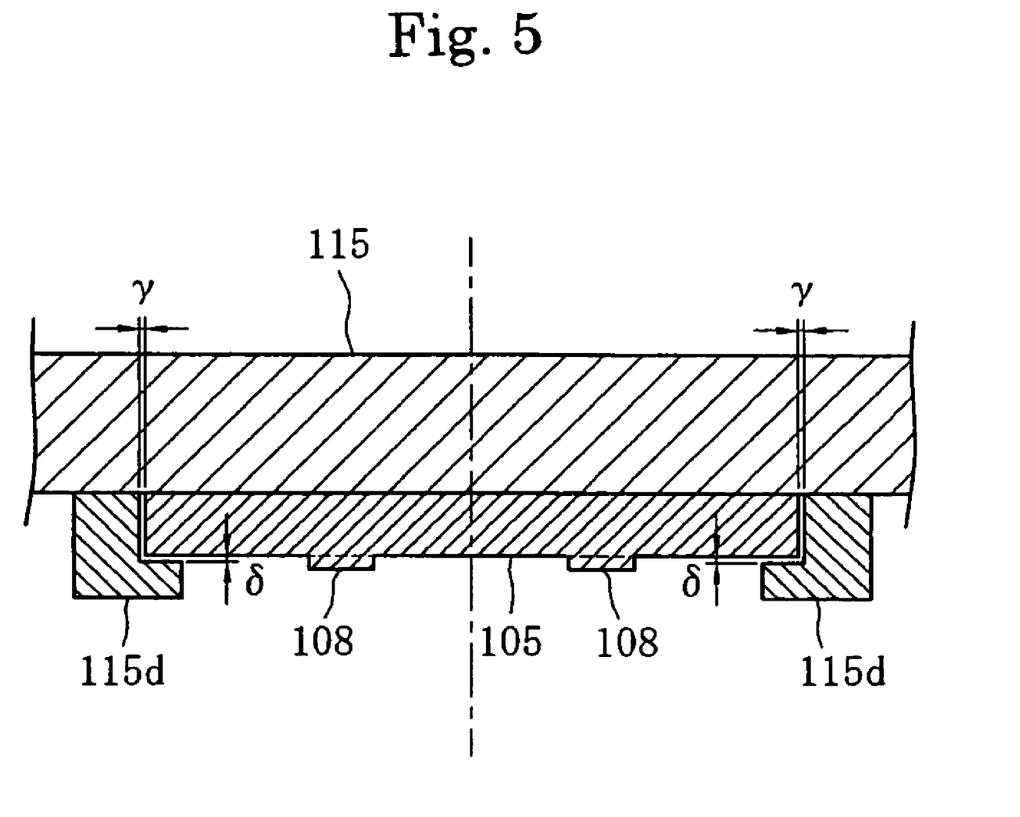
FIG. 5 is a diagram showing a cross-sectional view of a joint portion according to a second embodiment of the present invention, where a first mold and a first mold base are joined.

FIG. 5 is a diagram showing a cross-sectional view of a joint portion according to a second embodiment of the present invention, where a first mold and a first mold base are joined. Retention jigs 115d that are L-shaped in cross-section are mounted on the first mold base 115 so as to prevent the first mold 105 from dropping out, by surrounding the first mold 105. At least some of the retention jigs 115d are detachably attached to the first mold base 115 by a bolt or the like. That is, at least some of the retention jigs 115d are removable, so that the removable retention jigs 115d can be removed to set the first mold 105 in position and the removed retention jigs 115d are re-attached to mount the first mold 105 on the first mold base 115.

When the first mold 105 is mounted on the first mold base 115, a vertical gap $\delta$ is formed between the retention jig 115d and the bottom of the first mold 105 as shown in FIG. 5, and a horizontal gap $\gamma$ is formed between the side of the first mold 105 and the retention jig 115d. As a result, the first mold 105 can move freely relative to the first mold base 115 through a range $2\gamma$, and thus the position of the first mold 105 relative to the back plate 1 can be corrected.

Figure 6:
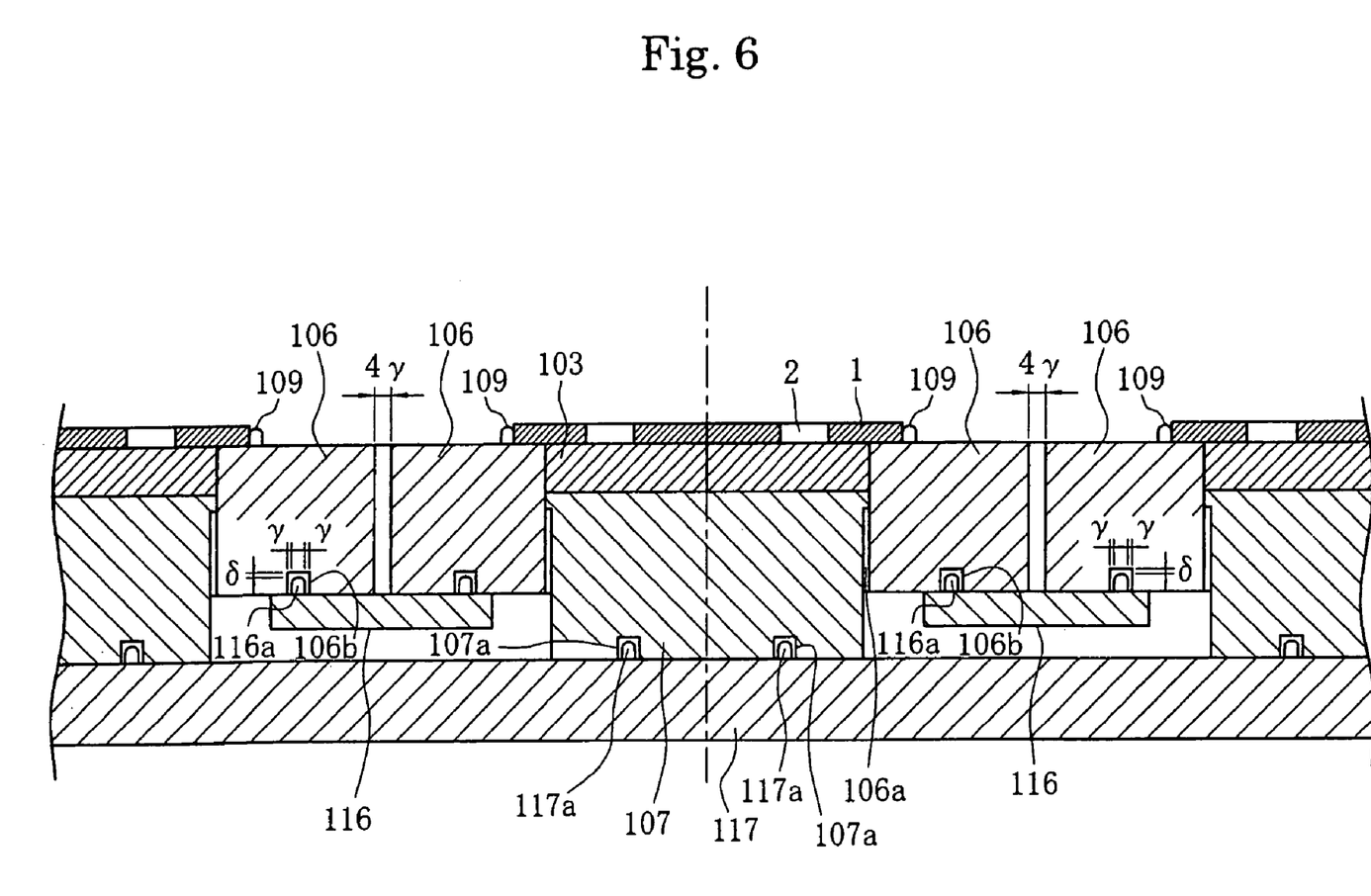
FIG. 6 is a diagram showing a cross-sectional view of a joint portion according to a third embodiment of the present invention, where a frame mold and a second mold portion are connected to each other.

FIG. 6 is a diagram showing a cross-sectional view of a joint portion according to a third embodiment of the present invention, where a frame mold and a second mold portion are connected to each other. Whereas in the first and second embodiments described above the first mold 105 moves freely with respect to the first mold base 115, in the third embodiment the frame mold 106 and the second mold 107 move freely.

Specifically, holes 106b are formed in the bottom of the frame mold 106 and projections 116a that enter the holes 106b are formed in the top of the frame mold base 116. The projections 116a loosely engage the holes 106b, securing gaps $\delta$ and $\gamma$ as shown in FIG. 2. Additionally, gaps $\delta$ and $\gamma$ may also be retained by providing holes 107a in the bottom of the second mold 107 and providing projections 117a on the second mold base 117 that engage the holes 107a loosely. Such a construction enables the frame mold 106 to move laterally together with the second mold 107 through a range $2\gamma$ and enables the projections 108 of the first mold 105 to enter the bonding through-holes 2.

In the embodiments described above, the alignment between the first mold 105 and either the frame mold 106 or the second mold 107 is accomplished by the projections 108 of the first mold 105 as the convex portions engaging the bonding through-holes 2 of the back plate 1 as the concave portions. However, the present invention is not limited to the arrangements thus described. Thus, for example, the alignment pins 109 provided on the frame mold 106 may be made longer than the thickness of the back plate 1 and used as the convex portion projection 108, in which case the concave portions that are engaged by the alignment pins 109 are formed in the first mold 105.

In addition, all embodiments are configured so that the first mold 105 approaches and withdraws from the frame mold 106 via the back plate 1. Alternatively, however, the back plate 1 may be set in the space 106a so that the first mold 105 and the frame mold 106 contact each other directly.

As can be appreciated by those of ordinary skill in the art, although in the above-described embodiments the first mold 105 is the upper mold and the second mold 107 is the lower mold, these assignations may be reversed, with the first mold 105 being the bottom mold and the second mold 107 being the top mold. Further, although the above-described embodiments are used to affix the friction material 9 to the back plate 1, alternatively, the embodiment may be used as apparatuses for forming semi-finished products 3 from powdered friction raw material 103.

As many apparently widely different embodiments of the present invention can be made without departing from the spirit and scope thereof, it is to be understood that the invention is not limited to the specific embodiments described herein except as defined in the appended claims.

What is claimed is:

1. A friction member manufacturing apparatus comprising:
    a frame mold, having a space for containing friction material, the space penetrating the frame mold;
    a first mold, disposed on one side of the space in the frame mold and moving relative to the frame mold so as to separably contact the frame mold, either directly or via an intermediate member; and
    a second mold, disposed on a side of the space in the frame mold opposite the side on which the first mold is disposed so as to enclose the space, the second mold capable of moving relative to the frame mold, in such a way as to enter and exit an interior of the frame mold;
    a first mold base for supporting a plurality of first molds;
    a frame mold base for supporting a plurality of frame molds; and
    a second mold base for supporting a plurality of second molds,
    at least one of the mold bases, and the molds supported by the at least one of the bases, supported in a state in which the base and the molds the base supports are movable in a direction perpendicular to a direction in which the second mold enters and exits the interior of the frame mold,
    a convex portion formed on either the first mold and the frame mold or intermediate member, and a concave portion formed on another side,
    the convex portion and the concave portion engaging each other so as to align the first mold and the frame mold with each other.

2. The friction member manufacturing apparatus as claimed in claim 1, wherein at least one of the convex portion and the concave portion is provided with guide surface for guiding the other portion.

3. The friction member manufacturing apparatus as claimed in claim 1, wherein at least one base and the molds supported by the base are the first mold base and the first mold.

4. The friction member manufacturing apparatus as claimed in claim 1, wherein at least one base and the molds supported by the base are the frame mold base and the frame mold, and the second mold base and the second mold.

5. The friction member manufacturing apparatus as claimed in claim 1, wherein:
    the friction member is a friction material affixed to a back plate;
    the intermediate member is the back plate of the friction member;
    the concave portion is a bonding through-hole formed in the back plate; and
    the convex portion is a projection that enters the bonding through-hole formed in the first mold.

6. The friction member manufacturing apparatus as claimed in claim 5, wherein the projection has a guide surface on at least one of a base portion or a tip portion thereof.

* * * * *